United States Patent Office 3,464,800
Patented Sept. 2, 1969

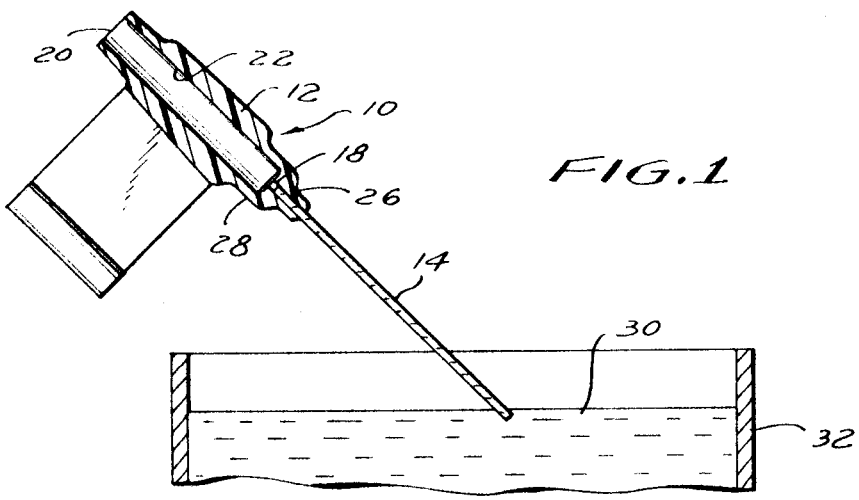
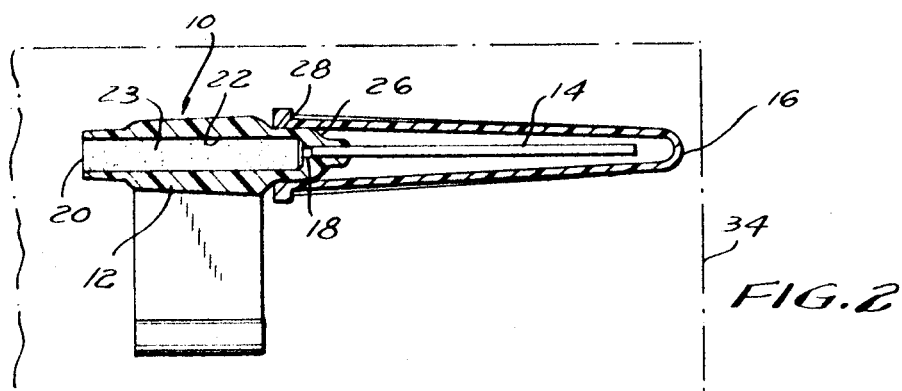
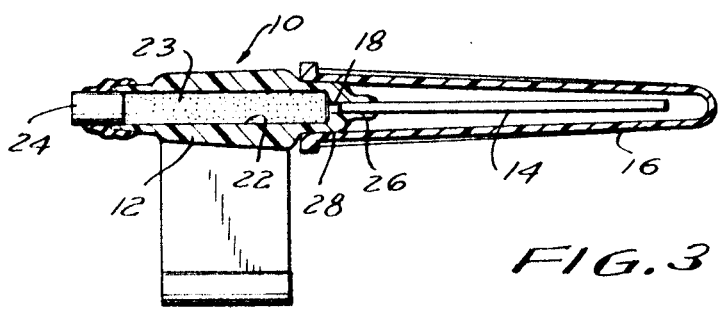

3,464,800
PIPETTE ASSEMBLY HAVING PRECISE QUANTITY OF DRY STABILIZED REAGENT AND METHOD OF PREPARING SAME
Horace W. Gerarde, 40 Knoll Road, Tenafly, N.J. 07670
Filed Oct. 27, 1966, Ser. No. 590,076
Int. Cl. B01l 3/02, 9/00
U.S. Cl. 23—259          2 Claims

ABSTRACT OF THE DISCLOSURE

Method of storing a precise measurement of dry reagent within a micro pipette assembly having an internal chamber within a molded body and an accurately calibrated capillary tube mounted on the body in communication with the chamber. A precise measurement of a mixture is drawn into the calibrated bore of said micro pipette assembly, then transferred to the inner chamber where the carrier fluid is evaporated, leaving the dry reagent.

---

This invention relates to a pipette assembly having a precise quantity of dry stable reagent disposed within the chamber thereof and to the method for providing the chamber with the precise quantity and for storing the same. More particularly it relates to the provision of such an assembly and stored dry reagent for use in analytical procedures, such as the determination of particular constituents or compounds in fluids, principally biological fluids, by employing micro, ultramicro and submicro procedures.

The performance of presently known laboratory analytical techniques, utilizing micro procedures, are time consuming and require both expensive and accurately calibrated equipment for dispensing precise quantities of reagent. Further, personnel or technicians capable of performing with a high degree of skill and dexterity are generally required to carry out successfully the various tests. The ultimate result is that the performance cost of micro-analytical procedures is greatly increased. Even with the cost factor involved it cannot be overemphasized that the reagent to be employed in any micro-analytical procedure must be accurately prepared so that the reagent employed is of a precise quantity.

Many micro-analytical procedures require microgram quantities of a dry reagent to perform a specific test. Micro quantities, by presently known methods, cannot be accurately weighed and dispensed. These quantities must be prepared in accordance with macro techniques. Thus, by forming a stock solution containing macro or submacro quantities of reagent and diluting the solution so prepared, the required microgram quantity of dry reagent will be present in a given volume of liquid. This given volume of liquid is processed to derive the precise microgram quantity of dry stable reagent for performance of a micro test.

Many dry stable reagents are unstable in solution. Therefore, daily preparation or preparation at the time a specific test is to be run is required. Not only is this practice tedious and time consuming, but repetition tends to increase the chance of error in initial weighing of the reagent with subsequent dilution of the solution formed therefrom introducing uncorrectable error in carrying out the test procedure. Further, where stock solutions cannot be stored without deterioration, all new solutions must be calibrated for content of reagent to determine if any errors have been made. The calibration or testing processes are also time consuming and are a contributing factor in determining the final cost. Further still, many reagents that are employed are expensive so that the practice of daily preparation of test solutions which are unstable, necessitating the discard of all but a negligible part thereof, is not economically sound practice.

It is, therefore, an object of this invention to overcome the difficulties and disadvantages heretofore encountered in the performance of micro-analytical procedures using stable dry reagents that become unstable when prepared in a solution by providing a pipette assembly containing a precise quantity of stabilized dry reagent that is ready for use in micro-analytical procedures.

Another object of the invention is to provide a method of introducing a precise quantity of stabilized dry reagent to the chamber of a pipette assembly for subsequent use in micro-analytical procedures.

A further object of the invention is to provide a reagent carrying pipette assembly that is relatively easy to use by persons having only a small degree of skill; that is inexpensively manufactured and therefore suitable for single usage; and capable of being stored for indeterminate periods of time thereby to maintain a reagent stock for use in the performance of specific micro-analytical procedures and obviate the need to prepare reagent for single tests.

Other objects and advantages of the present invention will become apparent to those skilled in the art as the following description is developed.

In a broad sense the invention is directed to a micro pipette assembly for use in micro-analytical test procedures for biological fluid constituents by the interaction of chemical compounds at least one of which is in the form of a precise micro measurement of a stabilized dry reagent. The assembly comprises a body member provided with a pair of openings and an intercommunicating chamber portion which contains the precise micro measurement. A capillary pipette having an accurately calibrated elongated bore adapted to receive a predetermined volume of liquid carrier containing said precise measurement is mounted on the member in sealing relationship with one of the openings so that said bore is in fluid communication with said chamber. Means in the form of a sheath for covering the capillary pipette is received on the member in a manner so that the predetermined volume disposed within the bore is transferred into the chamber by a pressure increase and upon evaporation of the liquid carrier a dry stable reagent residue remains.

The invention also contemplates the method of providing and storing a precise micro measurement of stabilized dry reagent within a chamber of a micro pipette assembly. The method comprises the steps of preparing an unstable mixture of a liquid carrier and a precise measurement of a dry reagent; drawing a mixture of a liquid carrier containing the precise predetermined volume of the unstable mixture into an accurately calibrated bore of a micro pipette assembly; transferring the predetermined volume from the bore to the chamber; and controllably heating the pipette assembly and contained predetermined volume so that the liquid carrier evaporates thereby to leave the precise micro measurement of stable dry reagent in said chamber.

In the accompanying drawing which illustrates a preferred embodiment of the present invention FIG. 1 is an elevational view in section showing the capillary pipette assembly partially immersed in a prepared solution;

FIG. 2 is an elevational view in section of the assembly subjected to controlled heating; and FIG. 3 is a view similar to FIG. 2 showing the stabilized dry reagent disposed within the chamber of the assembly and isolated from the atmosphere.

In the drawing, the pipette assembly for storing a precise quantity of dry stabilized reagent is generally designated by the numeral 10. The assembly comprises a body member 12, a capillary tube 14 and a sheath 16.

The body is to be relatively rigid and may be formed of a resin or plastic that is chemically inert to various materials with which it comes in contact and may be fabricated by any of the recognized procedures, such as by molding. Various materials that may be used are polyethylene, polypropylene, polyamide or polyvinylchloride and the like. Preferably the body should be either transparent or translucent thereby to allow visual inspection, as will be discussed, so as to determine the passage of liquid reagent from the capillary tube to the body chamber, the evaporation of the liquid carrier and the removal of the dry material during the test procedure.

As shown in the figures, the body is provided with a pair of openings 18 and 20 that are spaced apart and intercommunicated by an overflow chamber 22. The chamber, as will be discussed, serves as a reservoir for the receipt of a predetermined volume and precise measurement of dry material and storage of the precise measurement of stabilized dry reagent 23.

Opening 20 is generally of a size equal to the internal diameter of the body and may, once the predetermined volume and precise measurement of dry material is introduced to the chamber and controllably heated to evaporate the liquid, be sealed by wax or left in an open condition, as choice dictates. Sealing may also be accomplished by means of a plug 24 (FIG. 3). To maintain a positive sealing relation between the plug and the inner wall of the body thereby to prevent reagent loss, the plug is normally of a diameter slightly in excess of the chamber diameter. A wax coating may also be provided around the plug and body to insure a more positive seal.

The opening 18, formed with a protruding neck or hub portion 26, is in the form of a longitudinal bore within which capillary tube 14 may be partially received in sealing relationship therewith. The length of the bore therefore gives stability to the tube when thus mounted.

Joining the hub to the body is a relatively flat tapered portion 28 upon which the sheath 16 is slidably received and frictionally maintained. The taper also permits the body portion, with the sheath removed, and the extending capillary tube to be slidably received and frictionally held within the open end portion of a container (not shown) that may hold other reagents necessarily employed when performing one of many analytical procedures. This container may be of the flexible type and due to the frictional fit of the body 12 within the container neck commonly practiced aspirating procedures may be employed to both dissolve the quantity of stabilized dry reagent in the contained reagent and draw the reagents from chamber 22. By aspirating a second or third time the entire quantity of reagent 23 may be drawn from the chamber 22. Aspirating also ensures that the chamber is washed.

The capillary tube 14 is opened at both ends and is of a size and shape such that it will receive a predetermined quantity of solution 30. The internal diameter of the tube is relatively small thereby to cause the solution to rise due to capillary action. The capillary tube 14 is mounted on the body 12 by receiving one end within the opening 18. Any suitable means, such as a friction fit, may be employed to maintain the interconnected relationship of parts.

Solution 30, disposed within a container 32, is of a precisely measured volume of solvent or carrier, for example, water, in which there is dissolved a precise quantity of solid reagent. The reagent, which is generally unstable in liquid form, is prepared in accordance with normal laboratory procedures. Thereafter the solution is diluted so that a precise quantity of solid reagent is dissolved in a given per unit volume of solvent, for example, one microgram per microliter of solution.

Capillary tube 14 preferably should be made of a material that will not break during careful handling or usage. Glass or plastic materials that are inert to and unaffected by the reagent that may be drawn therethrough may be used. Glass is preferred since it is both an inert substance and further has a transparent characteristic so that the height of the liquid column therein is readily discernible.

The capillary is formed with a uniform bore of small diameter and a predetermined length corresponding to a predetermined volume such that said predetermined volume may be achieved by filling the bore with liquid. Due to the small diameter of the bore, liquid will rise in the known manner to completely fill the same.

Sheath 16 may, if preference dictates, form a part of the pipette assembly and may be an elongated hollow member that is mounted on the body 12, thereby to envelop and provide protection for the capillary tube. The sheath provides an additional and important function as will be discussed. The sheath may be fabricated from any material, such as the materials as discussed above.

The implementation of the pipette assembly having a precise quantity of stabilized dry reagent stored therein is relatively simple. The basic steps are diagrammatically shown in the figures. A solution having a precise quantity of reagent per unit volume is prepared as discussed above. The capillary tube of the pipette assembly (FIG. 1) is introduced into the solution 30 so that the solution rises within and completely fills the capillary bore. When completely filled the tube is removed from the solution and the liquid column therein is transferred to the chamber 22. Transfer is accomplished by mounting the sheath 16 on the body 12. During mounting, the air trapped within the sheath is slightly compressed resulting in an increase in pressure. With the sheath in place the equalization of pressure forces the liquid column from the capillary bore and into the chamber at its junction with the bore. The sheath is necessarily maintained on the body so that the solution is not permitted to reenter the bore. The assembly is then placed within an oven 34 (shown in phantom in FIG. 2) or otherwise suitably subjected to controlled heating. Heating, dependent upon the material, is carried out at temperatures generally between 30°–50° C. Due to heating additional pressure increases within the sheath causes the solution to further enter the chamber and the residue will deposit at a point dependent upon the temperature. The residue is in the form of a stabilized dry reagent. The chamber containing the stabilized dry reagent may thereafter be sealed, as described, and the assembly may be packaged, distributed and subsequently used in suitable ultra-micro or micro-analytical procedures. Generally, in packaging, the sheath is retained on the body to provide protection for the capillary.

Other procedures may be employed to transfer the liquid column from the capillary bore to the chamber as, for example, by applying a mild aspirating force at the open end 20. The former procedure, therefore, is one of many and has been practiced with good results. Also, the assembly may be subjected to drying under room temperatures for the purpose described, thereby obviating the need for a drying oven.

Example 1.—Preparation of stabilized reagent in dry form for storing in a pipette assembly A mixture is formed by dissolving 0.0125 gram of sodium pyruvate in 1 liter of water.

1 milliliter of this mixture is diluted by adding it to 999 ml. of water so that the resulting mixture contains 0.0125 microgram of sodium pyruvate per milliliter of water.

A pipette, as described, having a precise calibrated capillary tube with a volume of 20 microliters is immersed in the mixture so that 20 microliters of mixture is drawn into the bore by capillary action.

By employing a mild suction or by placing the sheath on the body (as described) the liquid column is forced into the chamber of the pipette assembly.

The chamber reagent is then subjected to controlled heating at approximately 30°–50° C. so that the water carrier is completely evaporated. If the reagent is labile or will otherwise deteriorate under heating conditions suitable freeze drying procedures may be employed to separate the carrier from the reagent residue.

The chamber may be closed to the atmosphere by a wax seal or plug, if desired. The pipette assembly having the stored quantity of stabilized dry reagent is thus capable of storage and subsequent use in a lactic acid dehydrogenase test.

Example 2

A mixture is formed by dissolving 0.01 gram of beta DPNH-coenzyme (diphosphopyridine nucleotide) in 1 liter of water.

1 milliliter of this mixture is diluted by adding it to 999 ml. of water so that the resulting mixture contains 0.01 microgram of beta DPNH-coenzyme per milliliter of water.

A portion of the resulting mixture is then drawn into the bore of the capillary tube, transferred from the bore to the chamber of the capillary pipette assembly, subjected to heating procedures and subsequently sealed within the chamber, all as described in Example 1.

When the pipette assembly is to be employed in a microanalytical procedure, the sheath is removed and the sealed end of the capillary is broken off. Thereafter the plug is removed and the reagent is sucked through the capillary, by the procedure aforedescribed, or by other appropriate means so that the chamber reagent is mixed with other components to be used in the particular analytical procedure. No measuring of the stabilized chamber reagent is required. There is no need to utilize highly accurate and precision instruments for measuring and dispensing precise measurements of reagent to be used in any test procedure nor is it necessary to prepare a solution having a precise quantity reagent therein. As should be appreciated, ordinary laboratory technicians with ordinary skill may perform the test and the pipette assembly is constructed so as to be disposable after a single use.

From the foregoing it should be apparent that the objects of the invention are carried out and that the disclosed pipette assembly may be advantageously employed in the performance of analytical procedures requiring the introduction and interaction of precise micro measurements of reagents to certain testing solutions. By this invention this micro measurement of reagent is maintained and stored within the chamber of the pipette assembly.

While the foregoing discloses but a preferred embodiment of the pipette assembly this disclosure is not intended to limit the invention for clearly modifications may be made without departing from the spirit and scope of the invention as defined by the appended claims.

I claim:

1. The method for providing and storing a precise micro measurement of stabilized dry reagent within the chamber of a micro pipette assembly of the type having an accurately calibrated bore communicating with said chamber comprising preparing an unstable mixture including a liquid carrier and a precise measurement of dry reagent, drawing a predetermined volume of the unstable mixture into the accurately calibrated bore of said micro pipette assembly, transferring said predetermined volume from said bore to said chamber, and controllably heating the pipette assembly and contained predetermined volume so that the liquid carrier evaporates thereby to leave said precise micro measurement of stable dry reagent in said chamber.

2. The method for providing and storing a precise micro measurement of a stable dry reagent within a body chamber of a micro pipette assembly in which a micro pipette having an accurately calibrated bore is mounted on the body to be in communication with the chamber thereby to adapt the assembly for use in a biological test procedure whereby the stored dry reagent, after frictionally mounting the body on a compressible container, may be redissolved by intermixing with container reagent and aspirated from the chamber through the micro pipette; said method comprising the steps of preparing an unstable mixture including a known volume of a liquid carrier and containing a precise micro measurement of an otherwise stable dry reagent; supplying the chamber with a volume of the unstable mixture so that when the mixture is controllably dried only the precise quantity of the again stable dry reagent necessary for the biological test will remain as residue; and, controllably drying the contained volume thereby causing the liquid carrier to evaporate so as to leave said precise micro measurement of stable dry reagent in said body chamber.

References Cited

UNITED STATES PATENTS

| | | |
|---|---|---|
| 1,433,075 | 10/1922 | Gottlieb. |
| 1,594,370 | 8/1926 | Kubota. |
| 1,680,616 | 8/1928 | Horst. |
| 2,677,373 | 5/1954 | Barradas. |

MORRIS O. WOLK, Primary Examiner

D. G. MILLMAN, Assistant Examiner

U.S. Cl. X.R.

23—292; 73—425.4